March 8, 1949.
J. H. BOARDMAN
2,463,593
SEAMED PIPE LOCK
Filed June 28, 1945
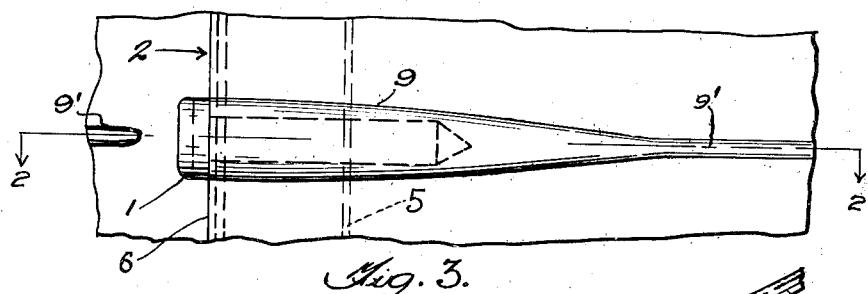
Fig. 3.
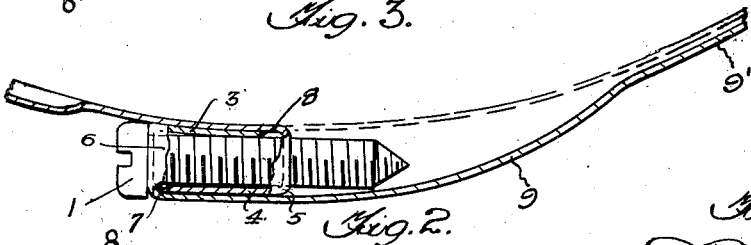
Fig. 2.
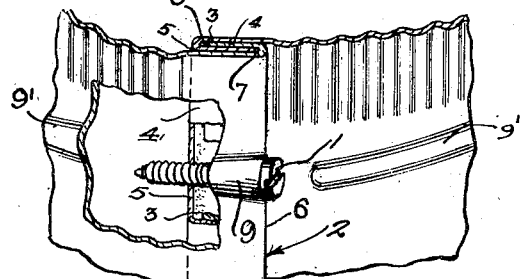
Fig. 1.
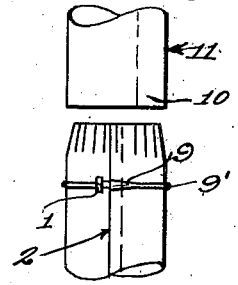
Fig. 6.
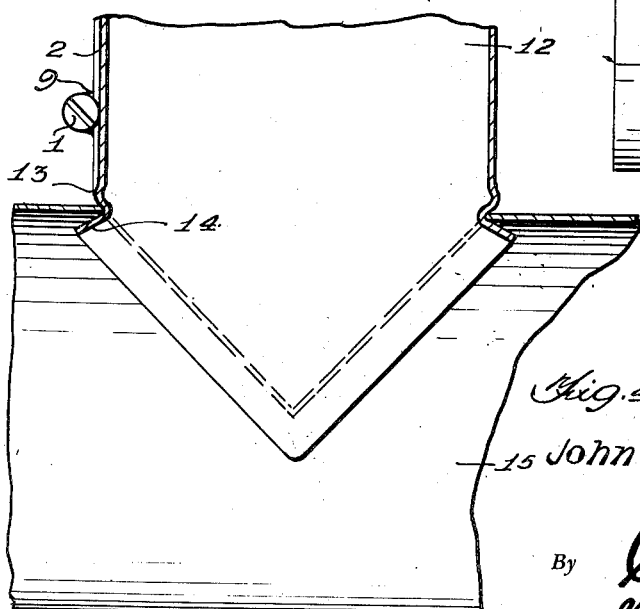
Fig. 4.
Fig. 5.
Inventor
John H. Boardman,
By Clarence A. O'Brien
and Harvey B. Jacobson
Attorneys Patented Mar. 8, 1949

2,463,593

UNITED STATES PATENT OFFICE 2,463,593

SEAMED PIPE LOCK

John H. Boardman, Flin Flon, Manitoba, Canada

Application June 28, 1945, Serial No. 602,068

3 Claims. (Cl. 138—74)

My invention relates to pipe locks for seamed pipe sections, an object of the invention being to provide a device of the character herewithin described whereby pipe sections of any shape such as straight-sections, elbows, T's and the like may be quickly, inexpensively and rigidly secured together with a minimum of difficulty and in a leak-proof manner.

With the foregoing object in view, and such other objects and advantages as will become apparent to those skilled in the art to which this invention relates as this specification proceeds, my invention consists essentially in the arrangement and construction of parts all as hereinafter more particularly described, reference being had to the accompanying drawings, in which:

Figure 1 is a perspective representation of my pipe lock.

Figure 2 is a section on the line 2—2 of Figure 3.

Figure 3 is a fragmentary elevational view of my pipe lock.

Figure 4 is a sectional representation of my pipe lock applied to a T-union.

Figure 5 is a side view of an elbow illustrating the manner of use of my pipe lock in such instance.

Figure 6 is a side view representing diagrammatically how a pipe section fitted with my locking means is first "shrunk" or reduced prior to attachment to the next section.

In the drawings like characters of reference indicate corresponding parts in the different figures.

I am aware that there are, available on the market, stove pipes having a clip or snap seam arrangement, but these have the disadvantage of not being leak-proof. Furthermore, by these arangements, when using the conventional form of pipe section, it is impossible to join several lengths without their sagging and working apart, for which reason they must be wired to sustain them in place thus creating a constant fire hazard.

Furthermore, when installing pipes for heating and ventilation systems etc., it is often necessary to cut a section of pipe to a desired length, but when a section is cut, it is impossible to secure a proper fit into the adjoining section, since only a complete section is tapered at one end thereof, and when the tapered end is cut off, the adjoining ends are exactly of the same diameter and no method of adjustment is provided.

My invention seeks to overcome the foregoing difficulties, and referring first to the accompanying Figures 1 to 3 inclusive, I would explain that at one end of an otherwise conventional pipe section I secure a screw 1 through the seam 2 of the pipe section in such a way that upon rotating the screw advancedly it will cause the inter-connected folds or laps of the seam to move and shift against each other, and the bends or folds to separate, thus increasing the girth, of the pipe section at the end thereof, or expanding the same circumferentially, so that it may initially be contracted for insertion into the next or companion section and thereafter expanded to form a tight fit against the inner surface of the end portion of the said section, all as hereinafter to be described in detail.

Preferably, what I call my "band portion" as best illustrated in Figure 1, is an integral part of the associated pipe section, although, if desired it may in fact constitute a separate and narrow locking band capable of securely joining two adjacent pipe sections in abutting relationship, by overlapping them as will be obvious to any one skilled in the art to which this invention pertains. However, when formed as an integral part of a pipe section, it is to be understood that the seam 2 through which the screw 1 extends is similar to, and part of, the seam which extends for the full length of the pipe section.

The seam illustrated in the accompanying drawings is of a conventional variety, and is what I define as a counterfolded interlocking seam wherein what I define as the sealing strips 3 and 4, are inter-facing and bounded by what I define as lines-of-fold 5 and 6, and by what I define as edges, or free edges, which means the extreme edges 7 and 8.

By the term counterfolded, I would explain that I mean that the material of the pipe section or band (if the latter is separate) is folded back upon itself adjacent the free or extreme edges of the blank of which the pipe section or band portion is formed, and in this connection, it will be recognized that a variety of different forms of seam may be shaped, wherein however at least one edge must be counterfolded, and at least one sealing strip must be provided to make sure that the pipe section or seam does not open up when the pipe or band is circumferentially expanded and thus allow leakage.

The counterfolded and interlocking seam which I have best illustrated in the accompanying Figures 1 and 2, is probably the commonest form of seam employed and the most practical, and, again by reference preferably to Figures 1 and 2, it will be seen that my screw 1 threads and feeds through the bends or so-called lines-of-fold 5 and 6 between the sealing laps 3 and 4, at right angles to the cylindrical axial plane of the pipe section or band portion.

It will also be seen by reference to Figures 1 to 3 inclusive that the material in the region of the screw 1 is expressly indented and embossed as at 9 for the accommodation of the said screw. In Figures 1 and 3 I have illustrated the conventional circumferential bead which is commonly formmed an inch or so from the ends of standard pipe sections, but when my arrangements are attached to a section which has been cut, then the bead may be dispensed with.

From the foregoing it will be apparent that when the screw 1 is rotated advancedly, and the head thereof is in abutting engagement with the running bend or fold 6, further rotation will cause the bend or fold 5 to be drawn towards the fold 6, whereby the band portion will be expanded or circumferentially adjusted in such a way that it will lock against the inner surface of the end 10 of the adjacent pipe section 11 illustrated in Figure 6.

It will appear apparent on consideration of course, that if it is desired to utilize the principle herewithin described in relation to a separate band intended to overlap the abutting ends of two pipe sections, that in order to lock the said pipe sections together, a contracting action rather than an expanding action is necessary to be applied to the band. This could readily be obtained either in connection with the counterfolded interlocking seam which I have illustrated and described, or any other form of counterfolded seam, the principal difference being that in order to secure a contracting locking action, it would be preferable to provide a square-ended screw, which would be threaded through the folded edge, or line-of-fold 6 only, the squared end simply pressing, or bearing up against the unperforated line-of-fold 5 so that the two lines or edges 5 and 6 would become separated more widely as the screw is advanced, thus shrinking or contracting the band as-a-whole.

In the accompanying Figure 4 I have illustrated the manner in which my pipe lock may be caused to secure a rigid and leak-proof union of T configuration, and in this instance, as will be clearly apparent to anyone skilled in the art to which this invention relates, it will be seen that the extreme edge of the pipe section 12 is beaded and flanged as at 13 and 14, the end being thus sheared to the configuration illustrated to engage an aperture cut in the right angulated pipe section 15. When the sheared end of the section 12 has been beaded and flanged as illustrated, it is inserted into the aperture formed within the section 15 and expanded precisely as I have already described in relation to Figures 1 to 3 inclusive and Figure 6.

Similarly with the elbow of Figure 5, wherein the edges 16 of the sections 17 are cut obliquely and then inter-fitted. After being inter-fitted, the male end is expanded against the inner surface of the female adjacent end, also in precisely the manner I have described in relation to straight or co-axial sections.

Finally, I would explain that although I have illustrated my invention, and described the same, both as an end portion integral with a piece of pipe section, or as a separate band, as though the seams employed were all of the interlocking variety, it may also be used with non-interlocking seams. With interlocking seams, to secure an expanding action by screw means, the screw must extend through holes adjacent both edges of the material, where as to secure a contracting action, it must only secure through one edge and butt up against a fold or flange thereby effecting a separating instead of a throwing-together action.

However, in the case of those forms of seam which cannot be considered as interlocking, a contracting action is obtained by securing the screw through both edges, and an expanding action by securing the screw through one edge only and causing it to butt up against a flange or beaded portion on the other edge.

I therefore do not desire to be restricted to the particular type of interlocking seam which I have illustrated, or to locking pipe sections together only by expansion means. Accordingly since various modifications can be made in my invention as hereinabove described and many apparently widely different embodiments of same made within the scope of the claims without departing from such spirit and scope, it is intended that all matter contained in the accompanying specification shall be interpreted as illustrative only and not in a limiting sense and I desire only such limitations placed thereon as are specifically expressed in the accompanying claims.

I claim:

1. In a circumferentially adjustable sheet metal pipe construction of the class described, a sheet metal blank rolled into cylindrical tubular form to define the body portion of the pipe, the adjacent free longitudinal edges of said blank being bent to provide longitudinally extending flanges and the respective flanges being interlocked to provide a seam, the flanges being in shiftable overlapping contact and said seam being thus extensible and retractible to make adjustments of the pipe, and means embodied mechanically and directly in said seam for both forcibly extending and retracting the same and for locking the seam in a predetermined adjusted position whereby to permit the diameter of said pipe to be enlarged or decreased and then mechanically locked in an established state, said means being in the form of a transversely disposed adjusting and locking screw, said screw being located between the overlapping flanges in order to frictionally bind the flanges together for retention and locking porposes.

2. A stove pipe having an adjustable and lockable seam comprising a regular blank of sheet metal rolled into cylindrical pipe form, the adjacent longitudinal edges of said blank having lateral return bends defining individual flanges, said flanges extending the complete length of the blank and the respective flanges fitting together in overlapping relation with the free edges of the respective flanges nesting into adjacent bends and defining an extensible and retractible seam which serves to permit the diameter of the pipe to be reduced or increased at will, the respective bends in said seam being disposed in spaced parallelism and provided with screw holes in alignment with each other, and a transverse adjusting and locking screw embodying a screw-threaded shank, the shank being threaded through the respective screw holes and lodged between the overlapping flanges whereby to permit said screw to be employed for shifting the flanges one against the other for adjustment purposes and locking the bends in positions relatively fixed, in the manner and for the purposes described.

3. In a circumferentially adjustable sheet metal pipe construction of the class described, a sheet metal blank rolled into cylindrical tubular form to define the body portion of the pipe, the adjacent free longitudinal edges of said blank being bent upon themselves to provide longitudinally extending seam-flanges and the respective flanges being shiftably interlocked to provide a seam, said flanges being in relatively shiftable overlapping contact and said seam being thus extensible and retractible to provide for diameter adjustments of the pipe, and screw means embodied transversely and directly in said seam for both forcibly extending and retracting the same and for locking the seam flanges in predetermined adjusted positions, whereby to permit the diameter of said pipe to be enlarged or decreased and then positively retained in an adjusted state.

JOHN H. BOARDMAN.

REFERENCES CITED

The following references are of record in the file of this patent:

UNITED STATES PATENTS

| Number | Name | Date |
|---|---|---|
| 64,552 | Milliken et al. | May 7, 1867 |
| 628,882 | Werner | July 11, 1899 |
| 997,072 | Mares | July 4, 1911 |
| 1,006,067 | Diehl | Oct. 17, 1911 |
| 1,148,041 | Minkler | July 27, 1915 |
| 1,978,203 | Holub | Oct. 23, 1934 |
| 2,214,480 | Schecter | Sept. 10, 1940 |
| 2,225,556 | Delaney | Dec. 17, 1940 |